US012688108B2

(12) United States Patent
Khosrowpour et al.

(10) Patent No.: US 12,688,108 B2
(45) Date of Patent: Jul. 21, 2026

(54) COMPUTATION LOCALITY UTILIZATION BASED ON AN APPLICATION INSTRUCTION SET

(71) Applicant: DELL PRODUCTS L.P., Round Rock, TX (US)

(72) Inventors: Farzad Khosrowpour, Pflugerville, TX (US); Nikhil Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 427 days.

(21) Appl. No.: 18/475,034

(22) Filed: Sep. 26, 2023

(65) Prior Publication Data

US 2025/0103458 A1     Mar. 27, 2025

(51) Int. Cl.
*G06F 11/34*          (2006.01)
*G06F 11/30*          (2006.01)

(52) U.S. Cl.
CPC ...... *G06F 11/3433* (2013.01); *G06F 11/3062* (2013.01); *G06F 11/348* (2013.01)

(58) Field of Classification Search
None
See application file for complete search history.

(56) References Cited

U.S. PATENT DOCUMENTS

| | | | | |
|---|---|---|---|---|
| 9,715,663 | B2 * | 7/2017 | Baldini Soares | ........ G06N 5/04 |
| 9,838,275 | B2 * | 12/2017 | Khosrowpour | ..... H04L 41/5096 |
| 10,032,114 | B2 * | 7/2018 | Baldini Soares | ...... G06N 20/00 |

| | | | | |
|---|---|---|---|---|
| 10,261,806 | B2 * | 4/2019 | Azhen | ...................... G06F 9/442 |
| 11,397,617 | B2 * | 7/2022 | Trigalo | .................. G06F 9/5005 |
| 12,204,325 | B2 * | 1/2025 | Aurongzeb | ............ G06Q 50/26 |
| 12,328,359 | B1 * | 6/2025 | Wali | ..................... H04L 67/1029 |
| 12,386,667 | B2 * | 8/2025 | Poothiyot | ............. G06F 9/5027 |
| 12,481,534 | B2 * | 11/2025 | Poothiyot | ............. G06F 9/5027 |
| 2015/0317563 | A1 * | 11/2015 | Baldini Soares | ........ G06N 5/04 |
| | | | | 706/12 |
| 2017/0019296 | A1 * | 1/2017 | Khosrowpour | ..... H04L 41/5096 |
| 2017/0220942 | A1 * | 8/2017 | Baldini Soares | ........ G06N 5/04 |
| 2018/0314533 | A1 * | 11/2018 | Azhen | ................... H04L 41/145 |
| 2019/0303207 | A1 * | 10/2019 | Vadapandeshwara | ...................... |
| | | | | G06F 9/5038 |

(Continued)

FOREIGN PATENT DOCUMENTS

| | | | | |
|---|---|---|---|---|
| CA | 3103238 A1 | * | 12/2019 | ......... G06F 9/44505 |
| CN | 119292782 A | * | 1/2025 | ............. G06N 3/084 |

(Continued)

*Primary Examiner* — Kevin R Steckbauer
(74) *Attorney, Agent, or Firm* — Larson Newman, LLP

(57) ABSTRACT

An information handling system includes a memory and an embedded controller. The memory stores a hardware selection machine learning model. The embedded controller communicates with the memory and executes the hardware selection machine learning model. During the runtime of the information handling system, the embedded controller determines an application to be executed within the information handling system and determines a characterization of the application. Based on the characterization of the application, the embedded controller determines a different normalized mutual information score for each hardware class within the information handling system. The embedded controller determines a different maximum score for each of the hardware classes and migrates the application to a component of a hardware class having a highest score.

17 Claims, 5 Drawing Sheets

(56) References Cited

U.S. PATENT DOCUMENTS

| | | | | | |
|---|---|---|---|---|---|
| 2019/0340095 | A1* | 11/2019 | Faibish | ............... | G06F 11/3409 |
| 2020/0272517 | A1* | 8/2020 | Trigalo | ................. | G06F 9/5005 |
| 2020/0311600 | A1* | 10/2020 | Kulkarni | ................... | G06N 3/09 |
| 2021/0026903 | A1* | 1/2021 | Grant | ...................... | H04L 51/42 |
| 2022/0083389 | A1* | 3/2022 | Poothia | ................. | G06F 9/5027 |
| 2023/0031998 | A1* | 2/2023 | Boyapalle | ............ | G06F 9/4856 |
| 2023/0091753 | A1* | 3/2023 | Kelly | .................... | G06F 9/5027 |
| | | | | | 718/104 |
| 2024/0012686 | A1* | 1/2024 | Wang | ..................... | G06N 3/045 |
| 2024/0029096 | A1* | 1/2024 | Aurongzeb | ........ | G06Q 30/0207 |
| 2024/0036999 | A1* | 2/2024 | Aurongzeb | ........... | G06F 9/5055 |
| 2024/0037002 | A1* | 2/2024 | Aurongzeb | ............. | G06F 9/542 |
| 2025/0029035 | A1* | 1/2025 | Jasleen | ............ | G06Q 10/06315 |
| 2025/0103458 | A1* | 3/2025 | Khosrowpour | ..... | G06F 11/3062 |
| 2025/0110724 | A1* | 4/2025 | Khosrowpour | ..... | G06F 11/3055 |
| 2025/0138610 | A1* | 5/2025 | Khosrowpour | ........... | G06F 1/26 |
| 2025/0138877 | A1* | 5/2025 | Khosrowpour | ....... | G06F 9/5033 |
| 2025/0139423 | A1* | 5/2025 | Khosrowpour | ........ | G06N 3/063 |
| 2025/0147811 | A1* | 5/2025 | Khosrowpour | ......... | G06F 9/505 |
| 2025/0377932 | A1* | 12/2025 | Jayaveeran | ........... | G06F 9/4881 |

FOREIGN PATENT DOCUMENTS

| | | | | | | |
|---|---|---|---|---|---|---|
| WO | WO-2019186585 | A1 | * | 10/2019 | ........... | G06F 9/4843 |
| WO | WO-2019237094 | A1 | * | 12/2019 | ......... | G06F 9/44505 |
| WO | WO-2021050275 | A1 | * | 3/2021 | .............. | G06N 3/09 |
| WO | WO-2025245533 | A1 | * | 11/2025 | .............. | G06F 8/71 |

* cited by examiner

300

302 — Start

304 — Receive top N applications and benchmarks

306 — Determine features for running applications on each class of hardware

308 — Determine metrics for each class of hardware

310 — Train an unsupervised deep auto-encoder on a feature set

A

312 — Map the auto-encoder reduced set to best metrics of each hardware class

B

314 — End

COMPUTATION LOCALITY UTILIZATION BASED ON AN APPLICATION INSTRUCTION SET

FIELD OF THE DISCLOSURE

The present disclosure generally relates to information handling systems, and more particularly relates to computation locality utilization based on an application instruction set in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems.

Information handling systems can also implement various virtualized architectures. Data and voice communications among information handling systems may be via networks that are wired, wireless, or some combination.

SUMMARY

An information handling system includes a memory that may store a hardware selection machine learning model. An embedded controller may communicate with the memory and execute the hardware selection machine learning model. During the runtime of the information handling system, the embedded controller may determine an application to be executed within the information handling system and determine a characterization of the application. Based on the characterization of the application, the embedded controller may determine a different normalized mutual information score for each hardware class within the information handling system. The embedded controller may determine a different maximum score for each of the hardware classes and migrate the application to a component of a hardware class having a highest score.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
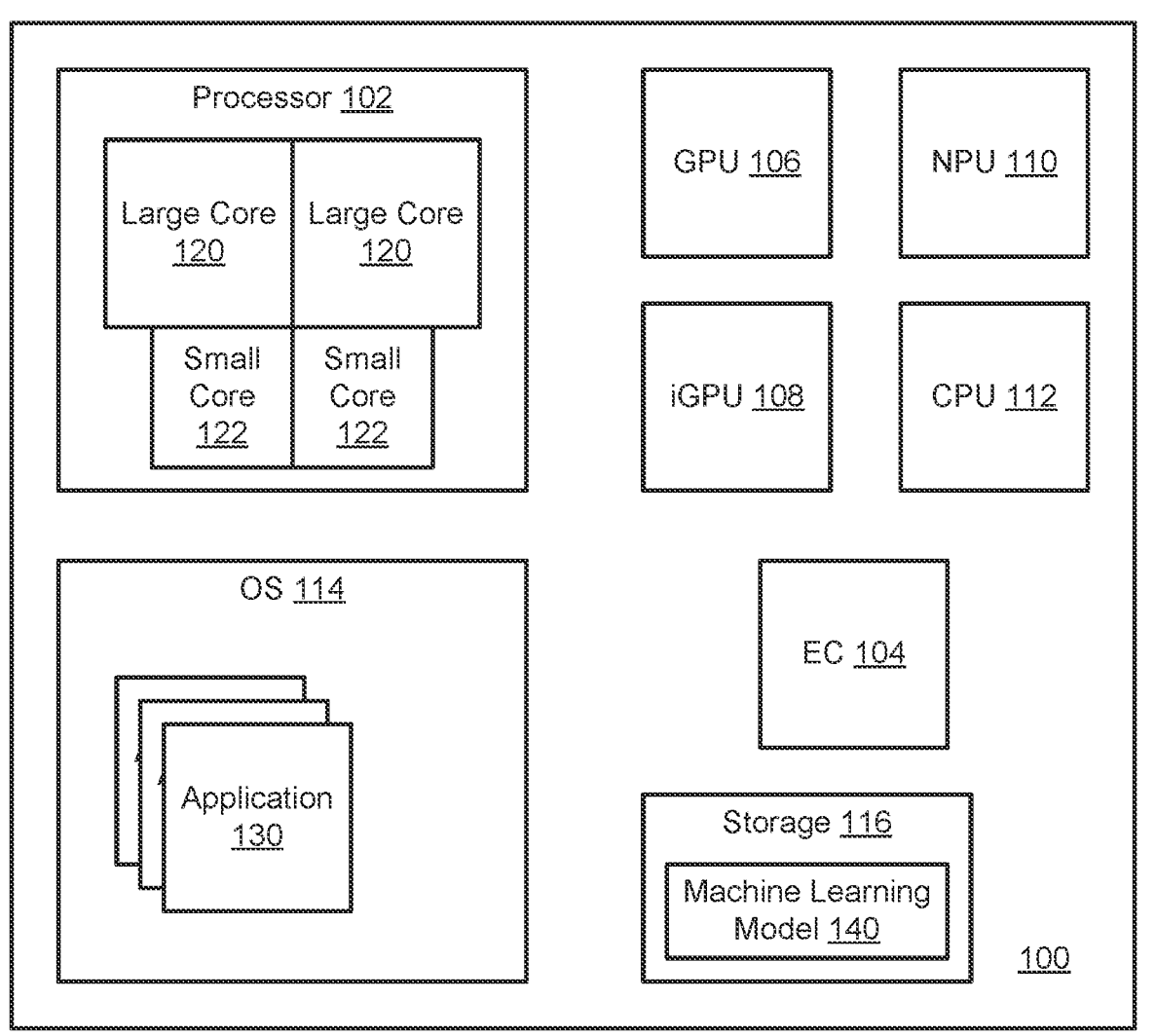
FIG. 1 is a block diagram of a portion of an information handling system according to at least one embodiment of the present disclosure.

FIG. 1 illustrates a main portion 100 of an information handling system according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a processor 102, an embedded controller (EC) 104, a graphics processing unit (GPU) 106, an integrated GPU (iGPU) 108, a NPU 110, a CPU 112, an operating system (OS) 114, and a storage 116. Processor 102 may be a multiple core processor, such that the processor circuitry includes more than one core to execute operations of information handling system 100. Processor 100 includes multiple large cores 120 and multiple small cores 122. OS 114 includes multiple applications 130 to be executed by processor 102. A hardware selection machine learning model 140 may be stored within storage 116. In certain examples, storage 116 may be located within EC 104 or any other component of information handling system 100 without varying from the scope of this disclosure. Information handling system 100 may include additional components without varying from the scope of this disclosure.

In certain examples, processor 102 may perform an operation to determine whether to utilize large cores 120 or small cores 122 to execute applications 130. In previous information handling systems, a selection of which core class to be utilized may be primarily determined based on the task schedule, number of threads, and quality of service (QoS) of the thread. However, previous information handling systems may not be able to perform efficiency operations that may lead to a soft affinization of a process to either small or big core classes, which in turn may improve efficiency of system performance and power usage. Information handling system 100 may be improved by selecting between small or big core classes 120 and 122 based on a determination of an efficiency between system performance and power usage.

In an example, each of the computation engines within information handling system, such as GPU 106, iGPU 108, NPU 110 and CPU 112. Portability of algorithms are being enabled by development of various libraries and executables for different hardware architecture. In certain examples, efficiency of locality of computation may be a function of power, latency, data movement and other factors. In an example, information handling system 100 may be further improved by determining an efficiency of performing a function on a particular engine, such as processor 102, GPU 106, iGPU 108, NPU 110, or CPU 112. The efficiency may be dependent on the instruction execution efficiency for a particular algorithm based on other parameters such as efficiency that is dependent on structure sizes and other parameters impacting data movements and memory.

In certain examples, EC 104 may perform one or more operations to classify an efficiency parameter for application 130 based on any suitable classification of the instructions for that application. The operations performed by EC 104 may be based on the EC executing hardware selection machine learning model 140. In an example, the classification of the instructions for application 130 may be based on whether the instructions are floating point or integer instructions. EC 104 may also determine the efficiency of application 130 based on an efficiency of computation for an algorithm.

In an example, EC 104 may characterize application 130 based on any suitable features of the application. For example, EC 104 may determine child process dependencies for application 130. After the dependencies have been determined, EC 104 may determine floating point operations/see (FTS) and Integer operations/see (INS) across all parent/child processes of application 130. EC 104 may then compare the number of FTS versus the number of INS across all parent and child processes of application 130. During the runtime of application 130, EC 104 may monitor the number of instructions executed per second, and instructions per clock cycle (IPC) per watt of power usage. In an example, EC 104 may determine the IPC via equation 1 below:

$$IPC = IPS/(\text{computing components} * \text{clock}) \quad \text{EQ. 1}$$

In equation 1 above, IPS is the instructions per second and IPC may be based on the IPS versus a number of computing components and the clock of information handling system 100. Also, during runtime of information handling system 100, EC 104 may determine time of completion of application 130, power consumed for computation, efficiency FLOPS/power usage and compare with INS/power usage.

EC 104 may compare the runtime result with unsupervised results on various compute classes, such as GPU 106, iGPU 108, NPU 110, CPU 112, and large and small cores 120 and 122 of processor 102, for which equivalent execution libraries exists. EC 104 may also determine an efficiency percentage and migrate the workload to the most efficient compute engine, such as a compute engine on GPU 106, iGPU 108, NPU 110, CPU 112, or large or small cores 120 and 122 of processor 102. Prior to runtime execution of hardware selection machine learning model 140, the learning model may be trained as described below with respect to FIG. 2.

Figure 2:
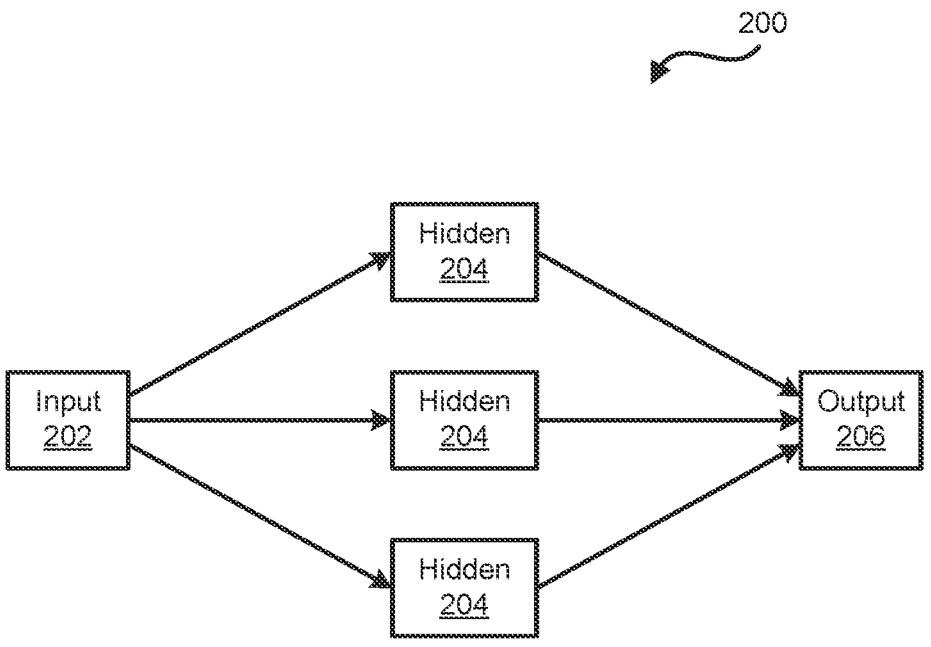
FIG. 2 is a block diagram of a machine learning system according to at least one embodiment of the present disclosure.

FIG. 2 illustrates a machine learning system 200 according to at least one embodiment of the disclosure. Machine learning system 200 includes an input layer 202, one or more hidden layers 204, and an output layer 206. Machine learning system 200 may be substantially similar to hardware selection machine learning model 140 of FIG. 1. Input layer 202 may receive any suitable data associated with an information handling system, such as information handling system 100 of FIG. 1 and provide the data to hidden layers 204. In an example, application instructions may be utilized as an input data to input layer 202 of machine learning system 200.

Hidden layers 204 may perform one or more operations on the input data, such as classifying the instructions for that application as floating point or integer instructions and efficiency of computation for an algorithm. In certain examples, hidden layers 204 may also determine a score or the efficiency parameter of an application for a hardware class based on the classification.

During training of machine learning system 200, hidden layers 204 may characterize various applications, such as application 130, received at input layers 202. In an example, the characterizing of the application may be natively performed and benchmarks of the application 130 may be characterized. Based on the characterization of applications 130, hidden layers 204 may measure or determine multiple features of the applications. In an example, the features of application 130 determined or measured by hidden layers 204 may include, but are not limited to, child process dependencies, FTS v INS across all parent/child processes, instructions/second, and IPC/watt of power usage. Hidden layers 204 may perform a characterization on processor 102. After the characterization of processor 102 being determined, hidden layers 204 may perform a characterization on other classes of hardware including, but not limited to, GPU 106, iGPU 108, NPU 110, and CPU 112 of FIG. 1.

Also, during the training of machine learning system 200 hidden layers 204 may characterize the efficiency of running an application, such as application 130 of FIG. 1, on each hardware class. In certain examples, hidden layer 204 may utilize collected feature data for an application and reduce the dimensions of machine learning system 200 by training an auto-encoder. The training of the auto-encoder may be unsupervised training based on the feature set of the hardware classes.

In an example, any suitable type of auto-encoder may be utilized, such as under complete auto-encoders, sparse auto-encoders, contractive auto-encoders, denoising auto-encoders, variational auto-encoders, or the like. These types of auto-encoders are well known in the art and will not be described further except to describe embodiments of the present disclosure. Hidden layers 204 may store the mapping of auto-encoder results and efficiency metrics for use during execution of machine learning system 200. Based on the training of hidden layers 204, machine learning system 200 may provide an identification of hardware class to execute an application on the output layer 200.

Referring back to FIG. 1, after hardware selection machine learning model 140 is trained as described with respect to machine learning system 200 in FIG. 2, EC 104 may execute the hardware selection machine learning model during runtime of information handling system 100. In an example, the runtime execution of hardware selection machine learning model 140 may enable EC 104 to determine a hardware class for application 130 may to migrate the application to the determined hardware class. Operations described herein performed by hardware selection machine learning model 140 may also be referred to operations performed by EC 104.

In an example, application 130 may be provided to the input layer of hardware selection machine learning model 140, which in turn may provide the application to one or more hidden layers of the model. Based on reception of application 130, hardware selection machine learning model 140 may characterize the application using a learning phase. EC 104, via hardware selection machine learning model 140, may track and pass the features of application 130 through the auto-encoder generated and stored during the training of hardware selection machine learning model. The auto-encoder of hardware selection machine learning model 140 may determine a reduced feature mapping for application 130.

Based on the feature mapping, a normalized mutual information score for data of application 130 is calculated for each hardware class. In an example, the normalized information may be a score between zero and one. Hardware selection machine learning model 140 may determine a maximum score for each hardware class and output the hardware class with a highest score. In an example, the highest score may be a highest efficiency score based on performance and power usage of the hardware class during execution of application 130. In response to the output of the hardware class with the highest score, EC 104 may migrate application to the identified hardware class, such as large cores 120 or small cores 122 of processor 102.

Information handling system 100 is improved by EC 104 utilizing the instruction set of application 130 to uniquely characterize the efficiency attributes of the application and migrating the application to run on a specific core or compute class. During the determination of hardware class to execute application, EC 104 does not have predetermined determinations based on a type of application. For example, EC 104 does not automatically migrate application 130 to GPU 106 when the application is for content creation, nor does the EC automatically migrate the application to NPU 110 when the application is a convolutional neural network (CNN) application.

Figure 3:
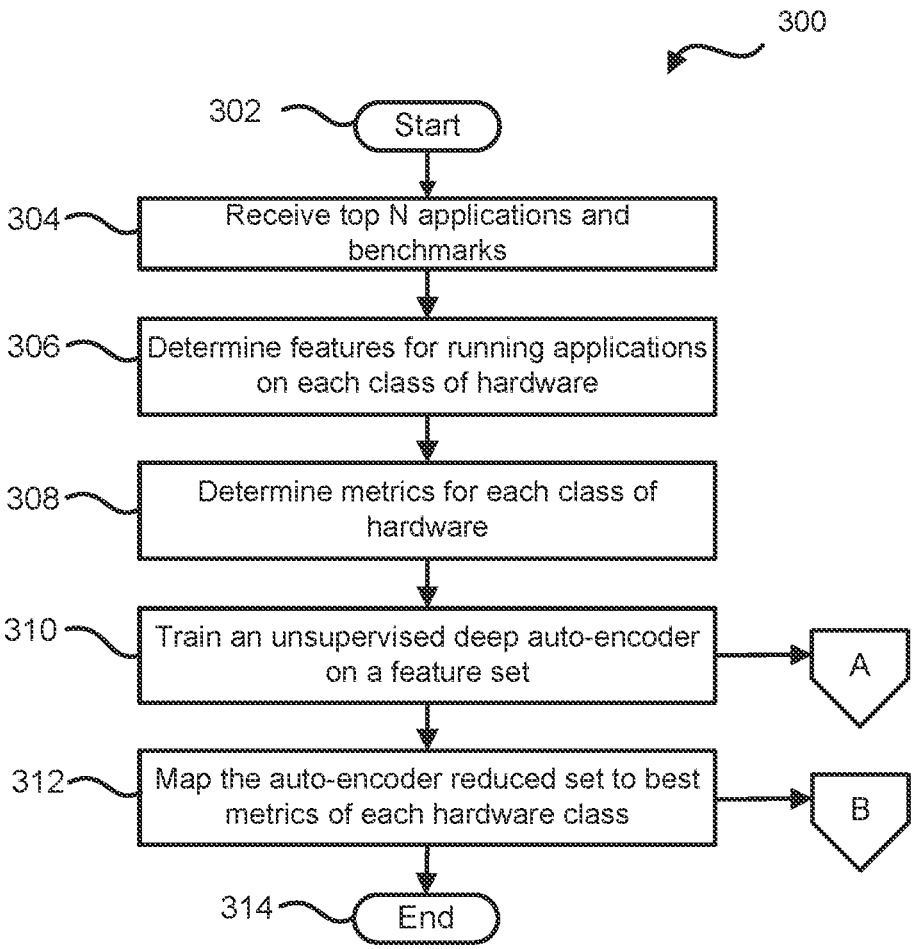
FIG. 3 is a flow diagram of a method for training a machine learning system according to at least one embodiment of the present disclosure.

FIG. 3 is a flow diagram of a method for training a hardware selection machine learning model according to at least one embodiment of the present disclosure, starting at block 302. In an example, method 300 may be performed by any suitable component including, but not limited to, EC 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, top applications and benchmarks within an information handling system, such as information handling system 100 of FIG. 1, are received at a hardware selection machine learning model. At block 306, features for running the application on each hardware class in the information handling system are determined. In an example, the features may include, but are not limited to, child process dependencies, FTS v INS across all parent/child processes, instructions/second, and IPC/watt of power usage. The hardware classes may be any suitable hardware components, such as large and small cores of a processor, a GPU, an iGPU, a NPU, an CPU, or the like.

At block 308, metrics for each hardware class are determined. In an example, the metrics for a hardware class may include, but are not limited to, FLOPS/watt of power usage, INS/watt of power usage, performance of application by the hardware class, and power usage of the hardware class while executing the application. At block 310, an unsupervised deep auto-encoder is trained for each feature set of the application and hardware class. In an example, the trained deep auto-encoder is utilized during runtime operations of hardware selection machine learning model as will be described with respect to block 412 of FIG. 4. At block 312, the auto-encoder is mapped to a reduced set of best metrics for each hardware class within an information handling system, and the flow ends at block 314. In an example, the mapping of the auto-encoder is utilized during runtime operations of hardware selection machine learning model as will be described with respect to block 418 of FIG. 4.

Figure 4:
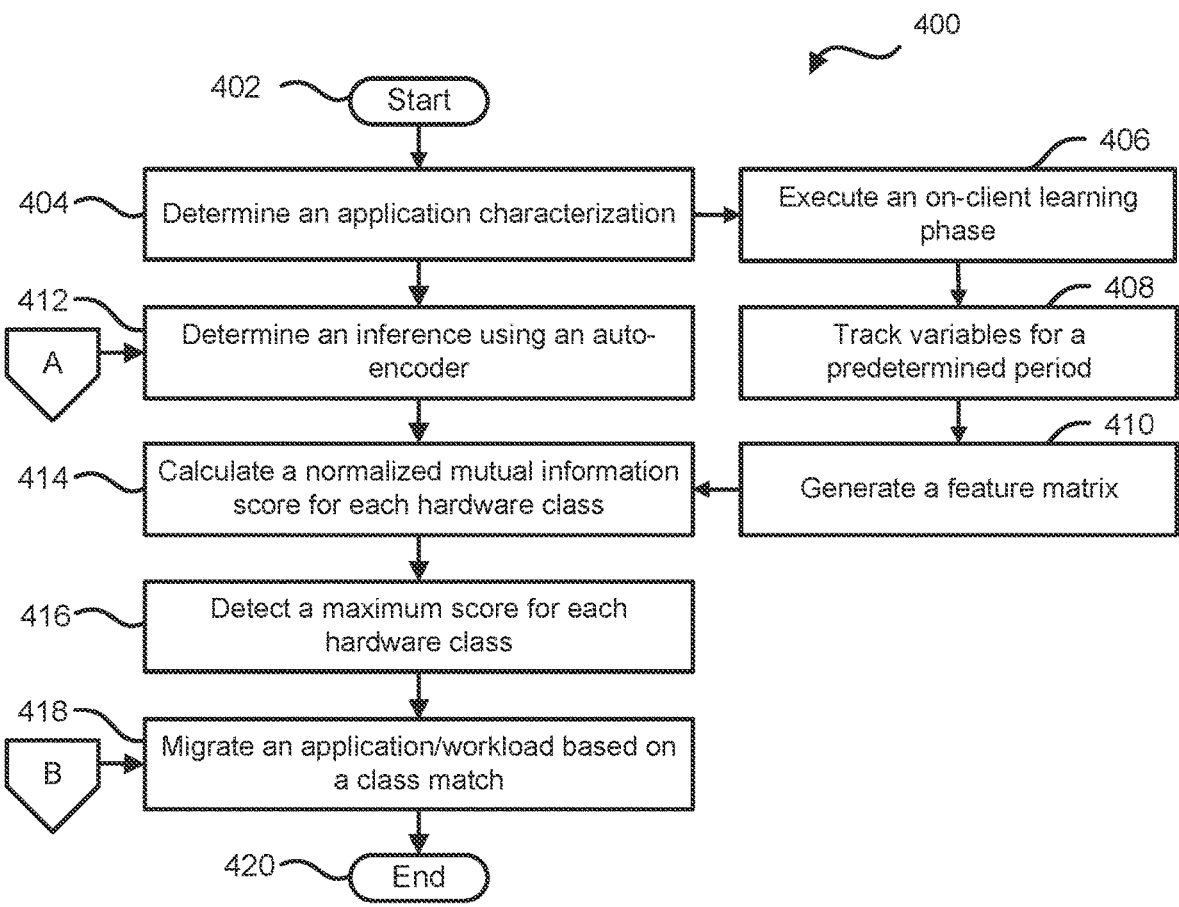
FIG. 4 is a flow diagram of a method for determining a hardware class to execute an application or workload according to at least one embodiment of the present disclosure.

FIG. 4 is a flow diagram of a method for determining a hardware class to execute an application or workload according to at least one embodiment of the present disclosure, starting at block 402. In an example, method 400 may be performed by any suitable component including, but not limited to, EC 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 404, an application characterization is determined. In an example, the application characterization may be first determined for a processor of the information handling system, and the processor may have large and small cores. The application characterization may then be performed for all other hardware components or classes components within the information handling system. At block 406, an on-client learning phase is executed. In an example, the on-client learning phase may utilize trained data for a hardware selection machine learning model and adjusting the training of the hardware selection machine learning model based on specific hardware classes within the information handling system.

At block 408, variables for the application are tracked for a predetermined amount of time. Based on the tracking of the variables, a feature matrix is generated at block 410. In an example, the feature matrix may include features of each hardware class available to execute the application. At block 412, an inference of a hardware class for the application is determined. In certain examples, the inference may be determined based on the trained auto-encoder of the hardware selection machine learning model.

At block 414, a normalized mutual information score is calculated or determined for each hardware class. In an example, the normalized mutual information score may be calculated based on both the feature matrix and the inference from the auto-encoder. In certain examples, each of the normalized mutual information scores may have a value between zero and one. Based on the normalized mutual information score for each of the hardware classes, a maximum score for each of the hardware classes is determined at block 416. In an example, each of the maximum scores may correspond to a different efficiency for the hardware classes. At block 418, the application is migrated to a hardware class with the highest score and the flow ends at block 420. In an example, the migration of the application to the hardware class with the highest may result in that particular hardware device executing the instructions associated with the application.

Figure 5:
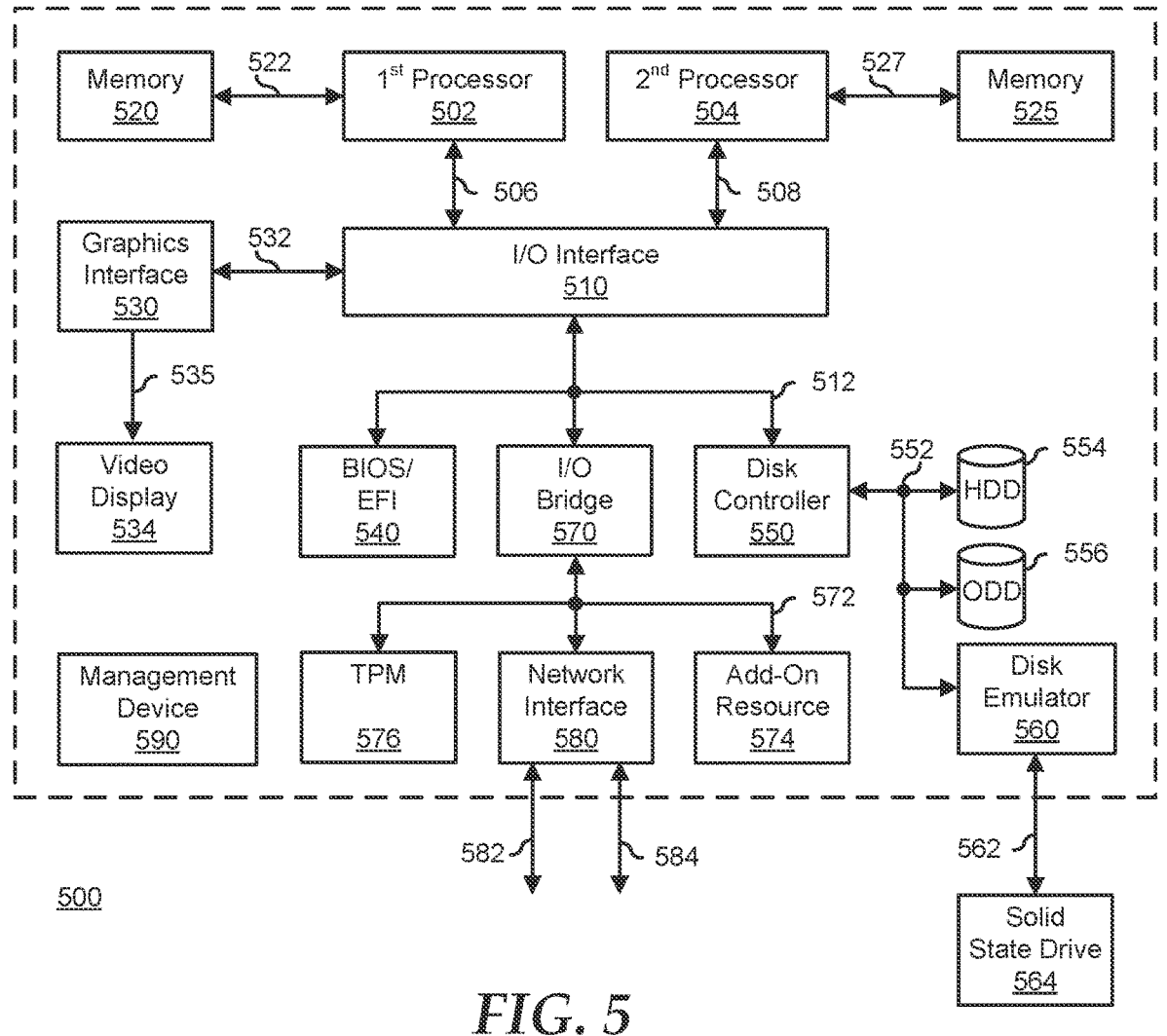
FIG. 5 is a block diagram of a general information handling system according to an embodiment of the present disclosure.

FIG. 5 shows a generalized embodiment of an information handling system 500 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/ UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532 and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 4394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512 or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500.

Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a memory configured to store a hardware selection machine learning model; and
an embedded controller configured to communicate with the memory, the embedded controller configured to execute the hardware selection machine learning model, and during a runtime of the information handling system the embedded controller configured to:
determine an application to be executed within the information handling system;
determine a characterization of the application;
based on the characterization of the application, determine a different normalized mutual information score for each hardware class within the information handling system;
determine a different maximum score for each of the hardware classes; and
migrate the application to a component of a hardware class having a highest score; and
during training of the hardware selection machine learning model, the embedded controller configured to:
determine features associated with running the application on each of the hardware classes;
determine metrics for each of the hardware classes;
train an unsupervised auto-encoder based on a feature set; and
map the auto-encoder to best metrics of each of the hardware classes.

2. The information handling system of claim 1, wherein the embedded controller further configured to:
track variables for the application for a predetermined amount of time; and
generate a feature matrix for the application based on the tracked variables.

3. The information handling system of claim 2, wherein the embedded controller further configured to:
determine an inference for the application based on an auto-encoder within the hardware selection machine learning model, wherein each of the different normalized mutual information scores are determined based on both the feature matrix and the determined inference.

4. The information handling system of claim 1, wherein each of the different maximum scores for the hardware classes are different efficiency scores for the hardware classes.

5. The information handling system of claim 4, wherein an efficiency score for one of the hardware classes indicates a relationship between performance of the application and power usage of the one of the hardware classes when executing the application.

6. The information handling system of claim 1, wherein the determined features include child process dependencies for the application, a number of instructions executed per second for the application, and power usage of a hardware class when executing the application.

7. The information handling system of claim 1, wherein the different hardware classes includes a graphics processing unit class, an integrated graphics processing unit class, an integrated central processing unit class, a large core class of a processor, and a small core class of the processor.

8. A method during a runtime of an information handling system, the method comprising:

determining, by an embedded controller of the information handling system, an application to be executed within the information handling system;

tracking variables for the application for a predetermined amount of time;

generating a feature matrix for the application based on the tracked variables;

determining an inference for the application based on an auto-encoder within a hardware selection machine learning model;

based on a characterization of the application, determining a different normalized mutual information score for each hardware class within the information handling system, wherein each of the different normalized mutual information scores are determined based on both the feature matrix and the determined inference;

determining a different maximum score for each of the hardware classes; and migrating, by the embedded controller, the application to a component of a hardware class having a highest score.

9. The method of claim 8, wherein each of the different maximum scores for the hardware classes are different efficiency scores for the hardware classes.

10. The method of claim 9, wherein an efficiency score for one of the hardware classes indicates a relationship between performance of the application and power usage of the one of the hardware classes when executing the application.

11. The method of claim 8, wherein during training of the hardware selection machine learning model, the method further comprises:

determining features associated with running the application on each of the hardware classes;

determining metrics for each of the hardware classes;

training an unsupervised auto-encoder based on a feature set; and mapping the auto-encoder to best metrics of each of the hardware classes.

12. The method of claim 11, wherein the determined features include child process dependencies for the application, a number of instructions executed per second for the application, and power usage of a hardware class when executing the application.

13. The method of claim 8, wherein the different hardware classes includes a graphics processing unit class, an integrated graphics processing unit class, an integrated central processing unit class, a large core class of a processor, and a small core class of the processor.

14. An information handling system comprising:

a memory configured to store a hardware selection machine learning model; and an embedded controller configured to execute the hardware selection machine learning model, and during a runtime of the information handling system the embedded controller configured to:

determine an application to be executed within the information handling system;

track variables for the application for a predetermined amount of time;

generate a feature matrix for the application based on the tracked variables;

determine an inference for the application based on an auto-encoder within the hardware selection machine learning model;

based on both the feature matrix and the determined inference, determine a different normalized mutual information score for each hardware class within the information handling system;

determine a different maximum score for each of the hardware classes, wherein each of the different maximum scores for the hardware classes are different efficiency scores for the hardware classes; and migrate the application to a component of a hardware class having a highest score.

15. The information handling system of claim 14, wherein during training of the hardware selection machine learning model, the embedded controller configured to:

determine features associated with running the application on each of the hardware classes;

determine metrics for each of the hardware classes;

train an unsupervised auto-encoder based on a feature set; and map the auto-encoder to best metrics of each of the hardware classes.

16. The information handling system of claim 15, wherein the determined features include child process dependencies for the application, a number of instructions executed per second for the application, and power usage of a hardware class when executing the application.

17. The information handling system of claim 14, wherein the different hardware classes includes a graphics processing unit class, an integrated graphics processing unit class, an integrated central processing unit class, a large core class of a processor, and a small core class of the processor.

* * * * *